(12) United States Patent
Yuwaki et al.

(10) Patent No.: US 11,440,227 B2
(45) Date of Patent: *Sep. 13, 2022

(54) PLASTICIZATION DEVICE, THREE-DIMENSIONAL SHAPING DEVICE, AND INJECTION MOLDING DEVICE

(71) Applicant: Seiko Epson Corporation, Tokyo (JP)

(72) Inventors: Kohei Yuwaki, Tsukuba (JP); Kazuhide Nakamura, Asahi (JP); Koichi Saito, Matsumoto (JP)

(73) Assignee: Seiko Epson Corporation

( * ) Notice: Subject to any disclaimer, the term of this patent is extended or adjusted under 35 U.S.C. 154(b) by 166 days.

This patent is subject to a terminal disclaimer.

(21) Appl. No.: 17/004,204

(22) Filed: Aug. 27, 2020

(65) Prior Publication Data
US 2021/0060839 A1 Mar. 4, 2021

(30) Foreign Application Priority Data

Aug. 29, 2019 (JP) .............................. JP2019-156432

(51) Int. Cl.
| | | |
|---|---|---|
| B29C 45/46 | (2006.01) |
| B29C 64/209 | (2017.01) |
| B29C 64/314 | (2017.01) |
| B33Y 30/00 | (2015.01) |
| B22F 3/22 | (2006.01) |

(Continued)

(52) U.S. Cl.
CPC ............ *B29C 45/464* (2013.01); *B22F 3/225* (2013.01); *B28B 1/001* (2013.01); *B28B 1/24* (2013.01); *B28B 17/026* (2013.01); *B29C 64/165* (2017.08); *B29C 64/209* (2017.08); *B29C 64/314* (2017.08); *B33Y 30/00* (2014.12); *B33Y 40/10* (2020.01)

(58) Field of Classification Search
CPC ... B29C 64/118; B29C 64/209; B29C 64/314; B29C 45/464; B29C 45/47; B22F 10/22; B22F 12/53; B33Y 10/00; B33Y 70/00; B33Y 40/10; B33Y 30/00
See application file for complete search history.

(56) References Cited

U.S. PATENT DOCUMENTS 3,375,549 A * 4/1968 Geyer .................... B29B 7/429
366/90
3,378,549 A 4/1968 Edwards et al.
(Continued)

FOREIGN PATENT DOCUMENTS

JP 2010-241016 A 10/2010

*Primary Examiner* — Nahida Sultana
(74) *Attorney, Agent, or Firm* — Harness, Dickey & Pierce, P.L.C.

(57) ABSTRACT

The plasticization device includes: a rotor rotating centered on a rotation axis by a drive motor and having a groove forming surface in which a first groove portion is formed along a rotation direction; a rotor case configured to accommodate the rotor; a barrel facing the groove forming surface and having a through hole; and a heating unit, in which a material supplied between the first groove portion and the barrel is plasticized by rotation of the rotor and heating by the heating unit to flow out from the through hole, and a side surface of the rotor has a material guiding port configured to guide the material to the first groove portion, and a second groove portion configured to feed the material supplied between the rotor and the rotor case to the material guiding port.

9 Claims, 8 Drawing Sheets

(51) Int. Cl.
  *B28B 1/24* (2006.01)
  *B28B 1/00* (2006.01)
  *B28B 17/02* (2006.01)
  *B29C 64/165* (2017.01)
  *B33Y 40/10* (2020.01)

(56) References Cited

U.S. PATENT DOCUMENTS

| | | | | |
|---|---|---|---|---|
| 3,790,328 | A | * | 2/1974 | Maxwell ................ B29C 45/50 425/207 |
| 4,746,478 | A | * | 5/1988 | Fujisaki .............. B29C 44/3442 366/280 |
| 4,779,989 | A | * | 10/1988 | Barr ........................ B29B 7/425 425/207 |
| 4,872,261 | A | * | 10/1989 | Sanyal ................ H05K 3/1225 101/127 |
| 4,981,364 | A | * | 1/1991 | Geyer .................... B29C 48/56 366/90 |
| 5,855,020 | A | * | 12/1998 | Kirsch .............. H04L 29/12009 |
| 5,855,929 | A | | 1/1999 | Geyer |
| 2012/0056342 | A1 | * | 3/2012 | Koslow ................... D01D 5/18 425/8 |

* cited by examiner

PLASTICIZATION DEVICE, THREE-DIMENSIONAL SHAPING DEVICE, AND INJECTION MOLDING DEVICE

The present application is based on, and claims priority from JP Application Serial Number 2019-156432, filed Aug. 29, 2019, the disclosure of which is hereby incorporated by reference herein in its entirety.

BACKGROUND

1. Technical Field

The present disclosure relates to a plasticization device, a three-dimensional shaping device, and an injection molding device.

2. Related Art

For example, JP-A-2010-241016 discloses an injection molding device including a rotor in which a spiral groove is formed on an end surface and a barrel in which a through hole is formed in a center. In the injection molding device, a material is softened and melted between the rotor and the barrel, and the material is injected into a mold through the through hole provided in the barrel.

In such an injection molding device, when the material is not stably supplied between the rotor and the barrel, the molten state of the material and an injection amount of the material may vary. Such a problem is not limited to the injection molding device, but is also a common problem for a plasticization device for plasticizing the material using a rotor and a barrel, a three-dimensional shaping device for shaping a three-dimensional shaped object with the material plasticized using the rotor and the barrel, and the like.

SUMMARY

According to one aspect of the present disclosure, a plasticization device is provided. The plasticization device includes: a rotor rotating centered on a rotation axis by a drive motor and having a groove forming surface in which a first groove portion is formed along a rotation direction; a rotor case configured to accommodate the rotor; a barrel facing the groove forming surface and having a through hole; and a heating unit, in which a material supplied between the first groove portion and the barrel is plasticized by rotation of the rotor and heating by the heating unit to flow out from the through hole, and a side surface of the rotor has a material guiding port configured to guide the material to the first groove portion, and a second groove portion configured to feed the material supplied between the rotor and the rotor case to the material guiding port.

DESCRIPTION OF EXEMPLARY EMBODIMENTS

A. First Embodiment

Figure 1:
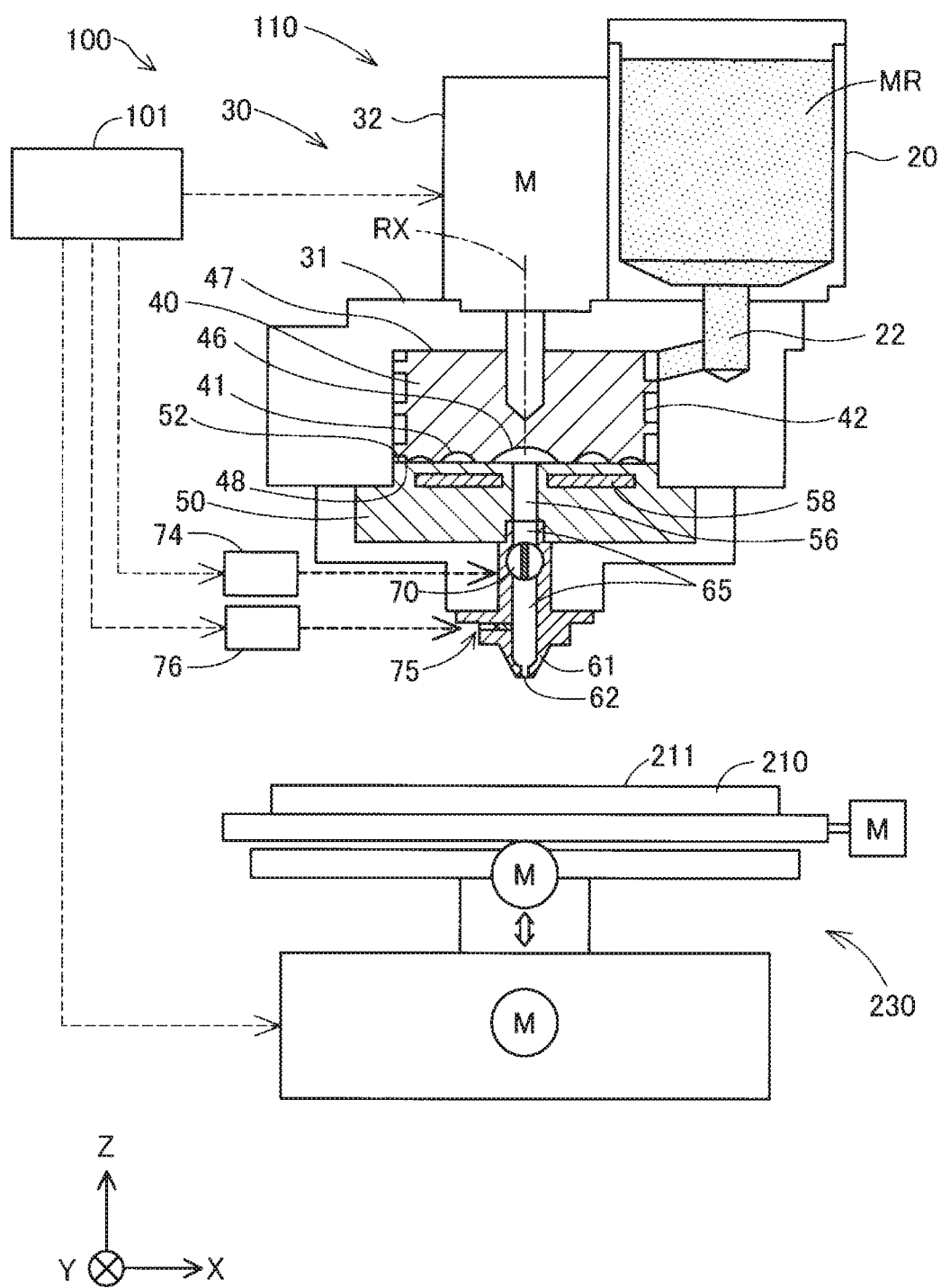
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 includes a control unit 101, a plasticization device 110 that generates a shaping material to discharge the shaping material, a table 210 for shaping that serves as a base of a three-dimensional shaped object, and a moving mechanism 230 that controls a discharge position of the shaping material.

The control unit 101 controls an overall operation of the three-dimensional shaping device 100 to execute a shaping processing for shaping the three-dimensional shaped object. The control unit 101 is implemented by a computer including one or a plurality of processors and a main storage device. The control unit 101 performs various functions by executing a program read into the main storage device by the processor. A part of the functions of the control unit 101 may be implemented by a hardware circuit. In the shaping processing executed by the control unit 101, the plasticization device 110 and the moving mechanism 230 are controlled according to shaping data of the three-dimensional shaped object.

Under the control of the control unit 101, the plasticization device 110 discharges the melted shaping material in a form of paste to a target position on the table 210. The plasticization device 110 includes a material supply unit 20 that is a supply source of a material MR before being converted into the shaping material, a plasticization unit 30 that converts the material MR into the shaping material, a nozzle 61 having a discharge port 62 configured to discharge the shaping material toward the table, a flow rate adjustment mechanism 70 that controls a discharge amount of the shaping material from the nozzle 61, and a suction unit 75 that suctions the shaping material to temporarily store the shaping material.

The material supply unit 20 supplies the material MR for generating the shaping material to the plasticization unit 30. The material supply unit 20 is implemented by, for example, a hopper that accommodates the material MR. The material supply unit 20 is coupled to the plasticization unit 30 via a communication path 22. In the present embodiment, the material MR is charged to the material supply unit 20 in a form of pellet. The communication path 22 is open near an upper portion of the side surface of the rotor 40 to be described later, and supplies a material toward an upper portion of the rotor 40. The material MR will be described later in detail.

The plasticization unit 30 plasticizes at least a part of the material MR supplied from the material supply unit 20 to generate the shaping material in the form of paste in which fluidity is exhibited, and guides the shaping material to the nozzle 61. The plasticization unit 30 includes a rotor case 31, a drive motor 32, the rotor 40, a barrel 50, and a heating unit 58. The rotor 40 is also referred to as a "flat screw". The plasticization unit 30 may plasticize the entire material MR, or for example, when the material MR contains a plurality of components, plasticize some of the components.

Figure 2:
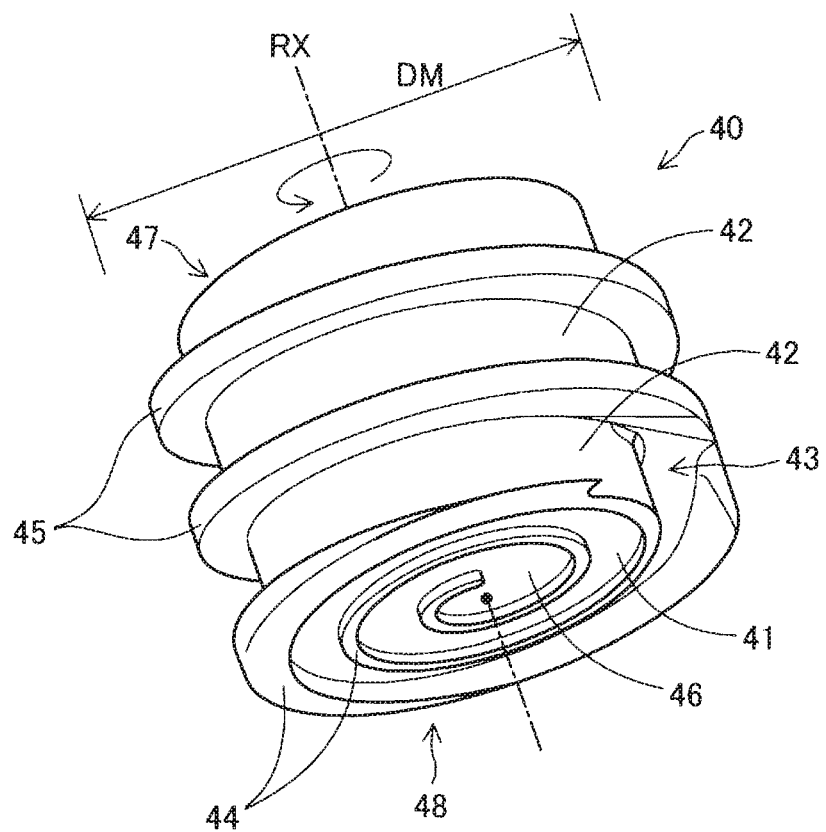
FIG. 2 is a perspective view of a rotor.

FIG. 2 is a perspective view of the rotor 40. The rotor 40 in the present embodiment has a substantially columnar shape, and includes a spiral flight portion 45 on an outer periphery thereof. In the present embodiment, a diameter DM of the rotor 40 is constant over the entire length along a rotation axis RX. In the present embodiment, the diameter of the rotor 40 is an outer diameter of the flight portion 45. As shown in FIG. 1, the rotor 40 is accommodated in the rotor case 31 having a cylindrical internal space for accommodating the rotor 40. An upper surface 47 of the rotor 40 is coupled to the drive motor 32. The rotor 40 rotates in the rotor case 31 centered on the rotation axis RX along the Z direction by a rotation drive force generated by the drive motor 32. The drive motor 32 is driven under the control of the control unit 101.

Figure 3:
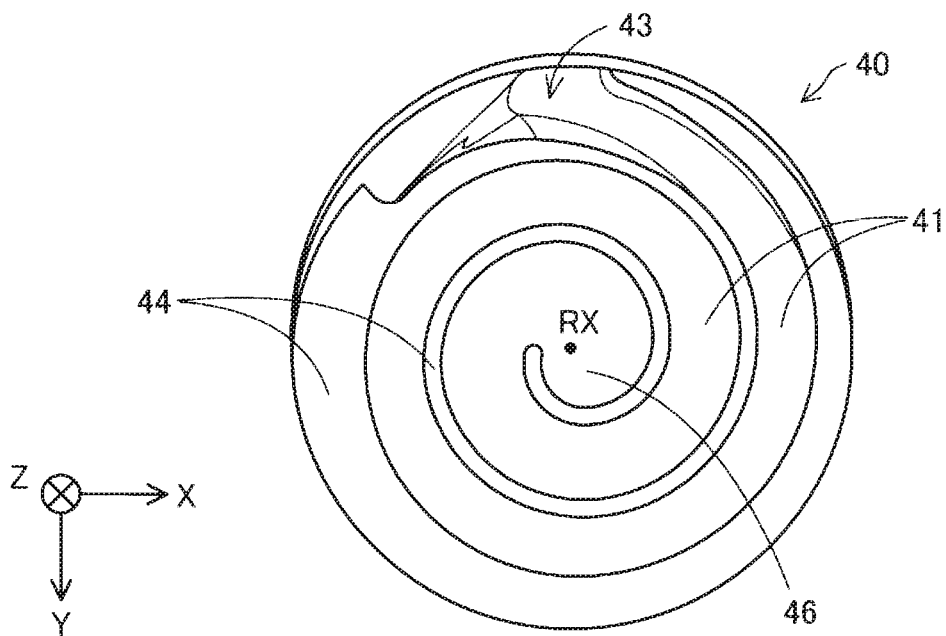
FIG. 3 is a bottom view of the rotor.

FIG. 3 is a bottom view of the rotor 40. Hereinafter, a lower surface of the rotor 40 is referred to as a groove forming surface 48. A first groove portion 41 is formed in the groove forming surface 48 of the rotor 40 along a rotation direction of the rotor 40. The first groove portion 41 forms a scroll groove. The first groove portion 41 extends from a central portion 46 toward the outer periphery of the rotor 40 in a form of swirl so as to draw an arc. The first groove portion 41 may be configured to extend spirally. The groove forming surface 48 is provided with a ridge portion 44 that forms a side wall portion of the first groove portion 41 and extends along the first groove portion 41.

Figure 4:
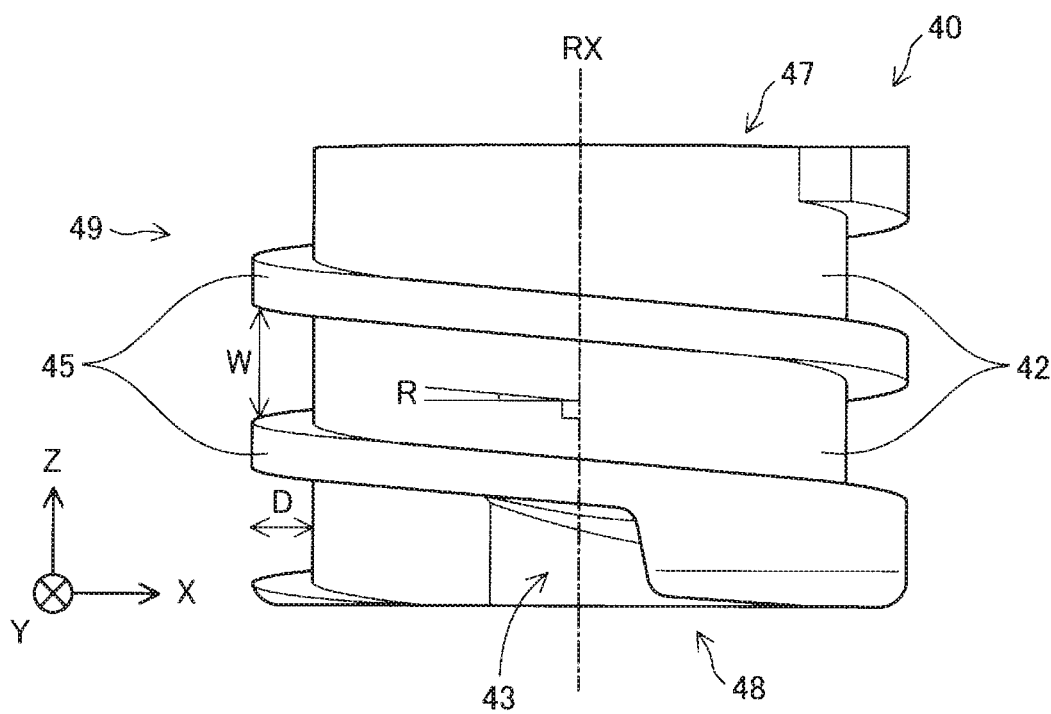
FIG. 4 is a side view of the rotor.

FIG. 4 is a side view of the rotor 40. The rotor includes a second groove portion 42 and a material guiding port 43 on a side surface 49 thereof. The second groove portion 42 is a groove portion formed between flight portions 45. In the present embodiment, the second groove portion 42 is spirally provided. The second groove portion 42 has a function of leading out, from the material supply unit 20, the material MR in the form of pellet supplied between the rotor 40 and the rotor case 31 to the material guiding port 43. The material guiding port 43 forms a recess that guides the material MR from the second groove portion 42 to the first groove portion 41.

In the present embodiment, a groove depth D, a groove width W, and an inclination angle R of the second groove portion 42 are constant. The inclination angle R is an inclination angle with respect to a plane orthogonal to the rotation axis RX. The inclination angle R in the present embodiment is an inclination angle at a center of the second groove portion 42 in a groove width direction. The inclination angle R in the present embodiment is an acute angle, for example, 5° to 45°. In the present embodiment, the groove forming surface 48 is orthogonal to the rotation axis RX. Therefore, the inclination angle R is also an inclination angle with respect to the groove forming surface 48.

As shown in FIGS. 2 to 4, in the present embodiment, one first groove portion 41, one second groove portion 42, and one material guiding port 43 are formed in the rotor 40. That is, the rotor 40 includes a set of the first groove portion 41, the second groove portion 42, and the material guiding port 43.

Figure 5:
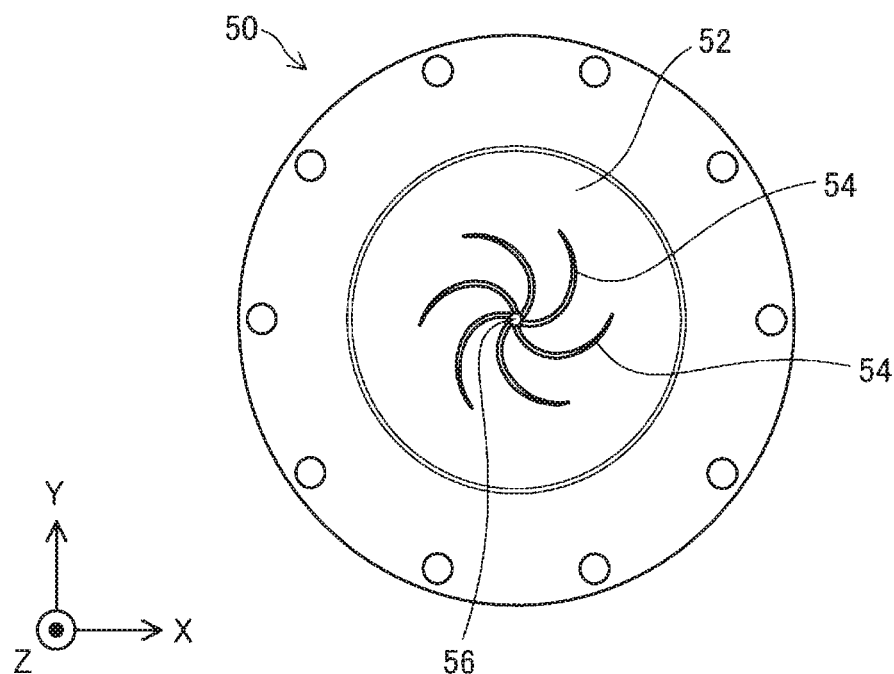
FIG. 5 is a top view of a barrel.

FIG. 5 is a top view of the barrel 50. The barrel 50 is disposed below the rotor 40. An upper surface of the barrel 50 faces the groove forming surface 48 of the rotor 40. Hereinafter, the upper surface of the barrel 50 is referred to as a "screw facing surface 52". A through hole 56 for supplying the shaping material to the nozzle 61 is formed at a center of the screw facing surface 52.

A plurality of guide grooves 54 coupled to the through hole 56 and extending from the through hole 56 towards an outer periphery in the form of swirl are formed in the screw facing surface 52. The plurality of guide grooves 54 have a function of guiding the shaping material flowing into the central portion 46 of the rotor 40 to the through hole 56.

As shown in FIG. 1, the heating unit 58 for plasticizing the material MR is embedded in the barrel 50. The heating unit 58 is controlled by the control unit 101. The heating unit 58 may be disposed below the barrel 50 instead of being embedded in the barrel 50. In addition, the heating unit 58 for plasticizing the material MR may be embedded in the rotor 40.

The material MR supplied to the second groove portion 42 provided on the side surface 49 of the rotor 40 is guided, through the material guiding port 43, to the first groove portion 41 provided on the lower surface of the rotor 40, flows along the first groove portion 41 by rotation of the rotor 40 while being melted between the first groove portion 41 and the barrel 50, and is, as the shaping material, guided to the central portion 46 of the groove forming surface 48. The shaping material in the form of paste flowing into the central portion 46 flows out to the nozzle 61 through the through hole 56 provided at a center of the barrel 50.

The nozzle 61 is coupled to the through hole 56 of the barrel 50 through a flow path 65 coupling the plasticization unit 30 and the nozzle 61. The nozzle 61 discharges the shaping material generated in the plasticization unit 30 from the discharge port 62 at a tip end toward the table 210. In the present embodiment, the flow path 65 extends along the Z direction, and the flow path 65 and the nozzle 61 are arranged along the Z direction.

The table 210 is disposed at a position facing the discharge port 62 of the nozzle 61. In the present embodiment, an upper surface 211 of the table 210 facing the discharge port 62 of the nozzle 61 is horizontal, that is, parallel to the X and Y directions.

The moving mechanism 230 is configured to change a relative position between the table 210 and the nozzle 61. In the present embodiment, a position of the nozzle 61 is fixed, and the table 210 is moved by the moving mechanism 230. The moving mechanism 230 includes a three-axis positioner that moves the table 210 in directions of three axes in the X, Y, and Z directions by drive forces of three motors. The moving mechanism 230 changes a relative positional relationship between the nozzle 61 and the table 210 under the control of the control unit 101.

In another embodiment, instead of a configuration in which the table 210 is moved by the moving mechanism 230, a configuration may be adopted in which the nozzle 61 is moved by the moving mechanism 230 with respect to the table 210 in a state where a position of the table 210 is fixed. In addition, a configuration may be adopted in which the table 210 is moved by the moving mechanism 230 in the Z direction and the nozzle 61 is moved by the moving mechanism 230 in the X and Y directions, or a configuration may be adopted in which the table 210 is moved by the moving mechanism 230 in the X and Y directions and the nozzle 61 is moved by the moving mechanism 230 in the Z direction. The relative positional relationship between the nozzle 61 and the table 210 can be changed even in these configurations.

The flow rate adjustment mechanism 70 rotates in the flow path 65 to change an opening degree of the flow path 65. In the present embodiment, the flow rate adjustment mechanism 70 is implemented by a butterfly valve. The flow rate adjustment mechanism 70 is driven by a first drive unit 74 under the control of the control unit 101. The first drive unit 74 is implemented by, for example, a stepping motor. The control unit 101 can control a rotation angle of the butterfly valve to adjust a flow rate of the shaping material flowing from the plasticization unit 30 to the nozzle 61, that is, the flow rate of the shaping material discharged from the nozzle 61.

The suction unit 75 is coupled between the flow rate adjustment mechanism 70 and the discharge port 62 in the flow path 65. When the supply of the shaping material from the nozzle 61 is stopped, the suction unit 75 temporarily suctions the shaping material in the flow path 65, thereby preventing tailing of the drooped shaping material as pulling a thread. In the present embodiment, the suction unit 75 is implemented by a plunger. The suction unit 75 is driven by a second drive unit 76 under the control of the control unit 101. The second drive unit 76 includes, for example, a stepping motor or a rack and pinion mechanism that converts a rotational force of the stepping motor into a translational motion of the plunger.

Figure 6:
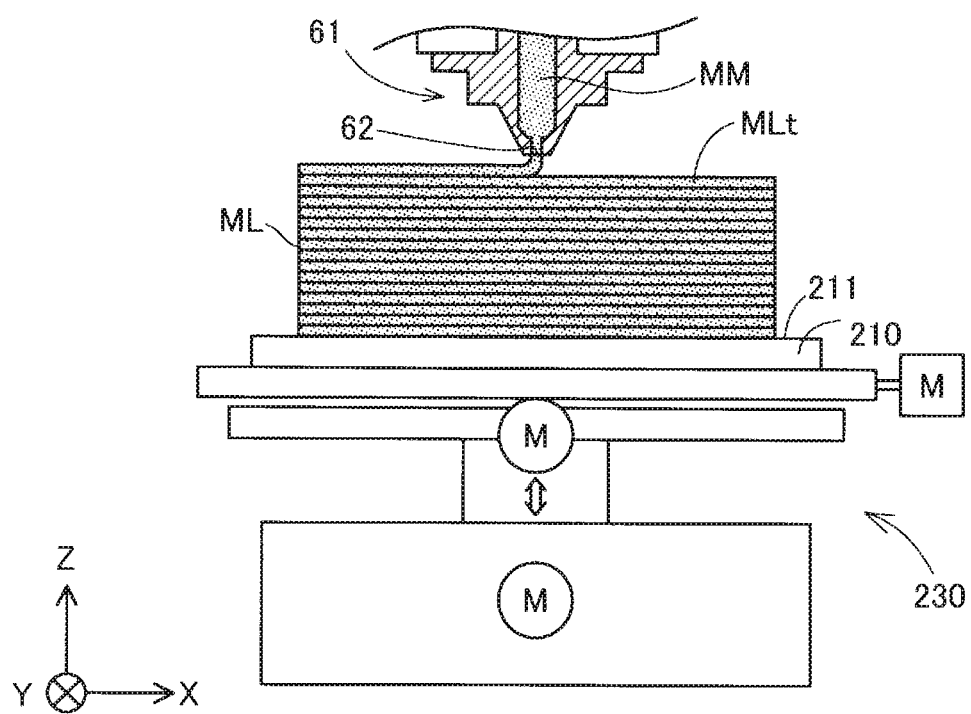
FIG. 6 is a diagram schematically showing a state where a three-dimensional shaped object is shaped.

FIG. 6 is a diagram schematically showing a state where the three-dimensional shaped object is shaped by the three-dimensional shaping device 100. In the three-dimensional shaping device 100, as described above, a shaping material MM is generated in the plasticization unit 30. Then, while the nozzle 61 is moved in a direction along the upper surface 211 of the table 210 by the moving mechanism 230, the shaping material MM is discharged from the nozzle 61 toward the upper surface 211 of the table 210.

Here, a layer formed of the shaping material MM discharged by a shaping processing when the nozzle 61 is positioned at the same height with respect to the upper surface 211 of the table 210 is referred to as a "shaping layer ML". The control unit 101 moves the nozzle 61 in the Z direction, and further stacks, by the next shaping processing, the shaping material MM on the shaping layer ML formed by the shaping processing so far, so as to shape a three-dimensional shaped object. That is, the three-dimensional shaping device 100 manufactures a three-dimensional shaped object by stacking shaping layers ML to any number of layers.

In the three-dimensional shaping device 100 of the present embodiment described above, the second groove portion 42 and the material guiding port 43 are formed on the side surface 49 of the rotor 40 of the plasticization device 110, and the material MR in the form of pellet is supplied, through the second groove portion 42 and the material guiding port 43, between the first groove portion 41 formed in the groove forming surface 48 and the barrel 50. According to such a configuration, since the material MR is temporarily stored in the second groove portion 42, it is possible to stably supply the material MR to the first groove portion 41 rather than directly supplying the material MR from the communication path 22 to the first groove portion 41. As a result, a molten state of the shaping material and the discharge amount of the shaping material can be stabilized.

In the present embodiment, since the second groove portion 42 is spirally formed, a force for pressing the material MR in the form of pellet toward a barrel 50 side is stronger than in the case where the second groove portion is linearly formed. Therefore, the material can be supplied more stably between the rotor 40 and the barrel 50, and a conveying force for feeding a molten material to the through hole 56 can be increased. In the present embodiment, the second groove portion 42 is spirally formed, but the second groove portion 42 may be provided along the outer periphery of the rotor 40, or may be linearly formed.

Here, a material of the three-dimensional shaped object used in the three-dimensional shaping device 100 described above will be described. The three-dimensional shaping device 100 can use various materials such as a material having thermoplasticity, a metal material, and a ceramic material as a main material to form the three-dimensional shaped object. The "main material" means a central material for forming a shape of the three-dimensional shaped object, and means a material occupying a content of 50% by weight or more in the three-dimensional shaped object. The above shaping materials include those in which main materials are melted alone, and those in which some of the contained components are melted together with the main materials to form a paste.

When the material having thermoplasticity is used as the main material, a shaping material is generated by plasticizing the material in the plasticization unit 30. The term "plasticize" means that the material having thermoplasticity is heated and melted.

For example, the following thermoplastic resin materials can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone The material having thermoplasticity may contain an additive such as a pigment, a metal, a ceramic, a wax, a flame retardant, an antioxidant, and a heat stabilizer. The material having thermoplasticity is plasticized by the rotation of the rotor 40 and the heating of the heating unit and is then converted into a melted state in the plasticization unit 30. After the shaping material generated by melting the material having thermoplasticity is discharged from the nozzle 61, the shaping material is cured due to a reduction in temperature.

It is desirable that the material having thermoplasticity is injected from the nozzle 61 in a state where the material is heated to a temperature equal to or higher than a glass transition point thereof and is then in a completely melted state. For example, a glass transition point of an ABS resin is about 120° C., and it is desirable that the ABS resin is discharged from the nozzle 61 at about 200° C. In order to discharge the shaping material in such a high temperature state, a heater may be provided in a periphery of the nozzle 61.

The following metal materials, for example, may be used as the main material in the three-dimensional shaping device 100 instead of the above materials having thermoplasticity.

In this case, it is desirable that a component to be melted at the time of generating the shaping material is mixed with a powder material obtained by converting the following metal material into powder, and then the mixture is charged into the plasticization unit 30 as the material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When the metal material or the ceramic material as described above is used as the main material, the shaping material disposed on the table 210 may be cured by sintering.

The powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20 as the material MR. The solvent can be used alone or in combination of two or more selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20 as the material MR.

Example of Binder

Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins

B. Second Embodiment

Figure 7:
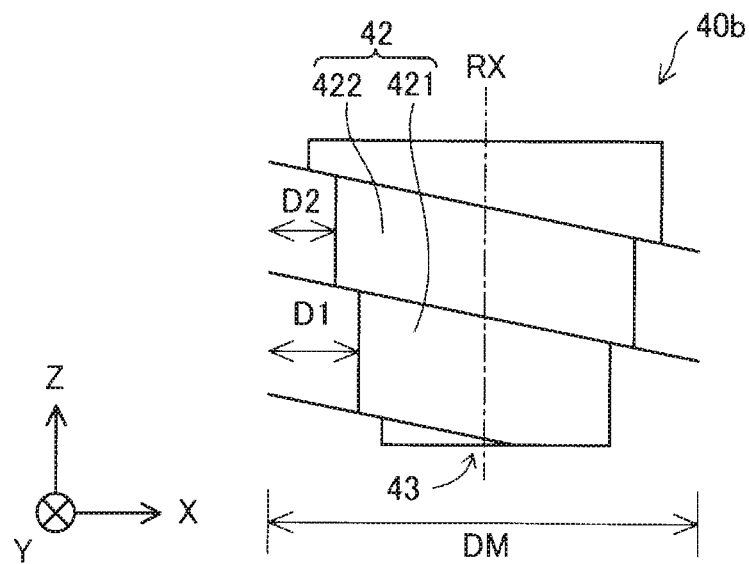
FIG. 7 is a side view showing a schematic configuration of a rotor according to a second embodiment.

FIG. 7 is a side view showing a schematic configuration of a rotor 40b according to a second embodiment. In the second embodiment and the first embodiment, the configuration of the rotor 40b is different, and the other configurations are the same. In the present embodiment, the second groove portion 42 of the rotor 40b includes a first portion 421 continuous with the material guiding port 43 and a second portion 422 farther from the material guiding port 43 than the first portion. A groove depth D1 of the first portion 421 is formed to be deeper than a groove depth D2 of the second portion 422. More specifically, although a diameter DM of the rotor 40b is constant, the second groove portion 42 is formed such that the groove depth of the second groove portion 42 becomes deeper toward the material guiding port 43. According to such a configuration, since the material easily concentrates near the material guiding port 43, the material can be supplied more stably to the first groove portion 41.

As described above, in the second embodiment, the groove depth D1 of the first portion 421 is formed to be deeper than the groove depth D2 of the second portion 422, but conversely, the groove depth D1 of the first portion 421 can be formed to be shallower than the groove depth D2 of the second portion 422.

C. Third Embodiment

Figure 8:
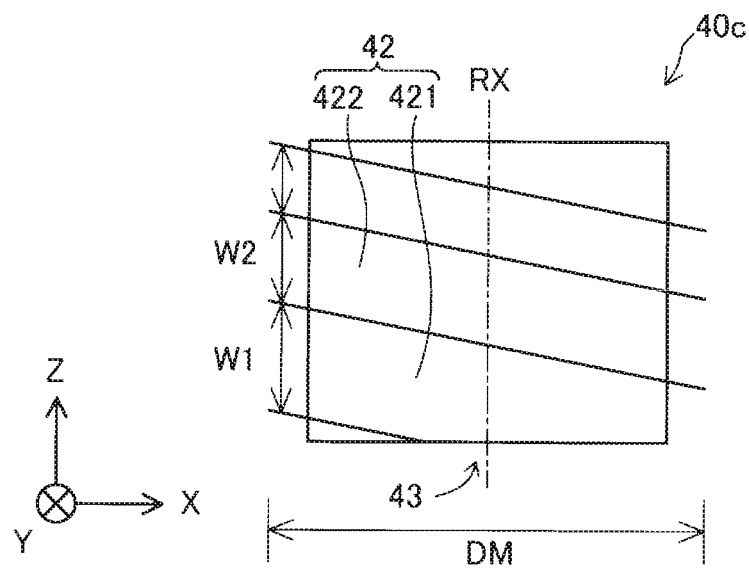
FIG. 8 is a side view showing a schematic configuration of a rotor according to a third embodiment.

FIG. 8 is a side view showing a schematic configuration of a rotor 40c according to a third embodiment. In the third embodiment and the first embodiment, the configuration of the rotor 40c is different, and the other configurations are the same. In the present embodiment, similarly to the second embodiment, the second groove portion 42 includes the first portion 421 continuous with the material guiding port 43 and the second portion 422 farther from the material guiding port 43 than the first portion. A groove width W1 of the first portion 421 is formed to be larger than a groove width W2 of the second portion 422. More specifically, the second groove portion 42 is formed such that the groove depth of the second groove portion 42 becomes larger toward the material guiding port 43. According to such a configuration, since the material easily concentrates near the material guiding port 43, the material can be supplied more stably to the first groove portion 41.

As described above, in the third embodiment, the groove width W1 of the first portion 421 is formed to be larger than the groove width W2 of the second portion 422, but conversely, the groove width W1 of the first portion 421 can be formed to be smaller than the groove width W2 of the second portion 422.

D. Fourth Embodiment

Figure 9:
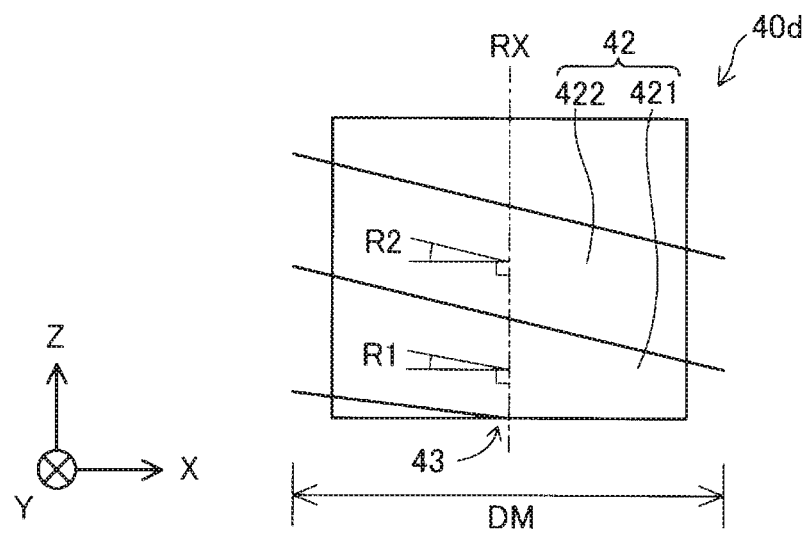
FIG. 9 is a side view showing a schematic configuration of a rotor according to a fourth embodiment.

FIG. 9 is a side view showing a schematic configuration of a rotor 40d according to a fourth embodiment. In the fourth embodiment and the first embodiment, the configuration of the rotor 40d is different, and the other configurations are the same. In the present embodiment, similarly to the second embodiment, the second groove portion 42 includes the first portion 421 continuous with the material guiding port 43 and the second portion 422 farther from the material guiding port 43 than the first portion. In the present embodiment, the second groove portion 42 is inclined with respect to the groove forming surface 48, and an inclination angle R1 of the first portion 421 is smaller than an inclination angle R2 of the second portion 422. More specifically, the second groove portion 42 is formed such that the inclination angle of the second groove portion 42 becomes smaller toward the material guiding port 43. According to such a configuration, since the inclination angle of the second groove portion 42 near the material guiding port 43 is small, the material can be smoothly supplied from the second groove portion 42 to the first groove portion 41.

As described above, in the fourth embodiment, the inclination angle of the first portion 421 is smaller than the inclination angle of the second portion 422, but conversely, the inclination angle of the first portion 421 can be larger than the inclination angle of the second portion 422.

E. Fifth Embodiment

Figure 10:
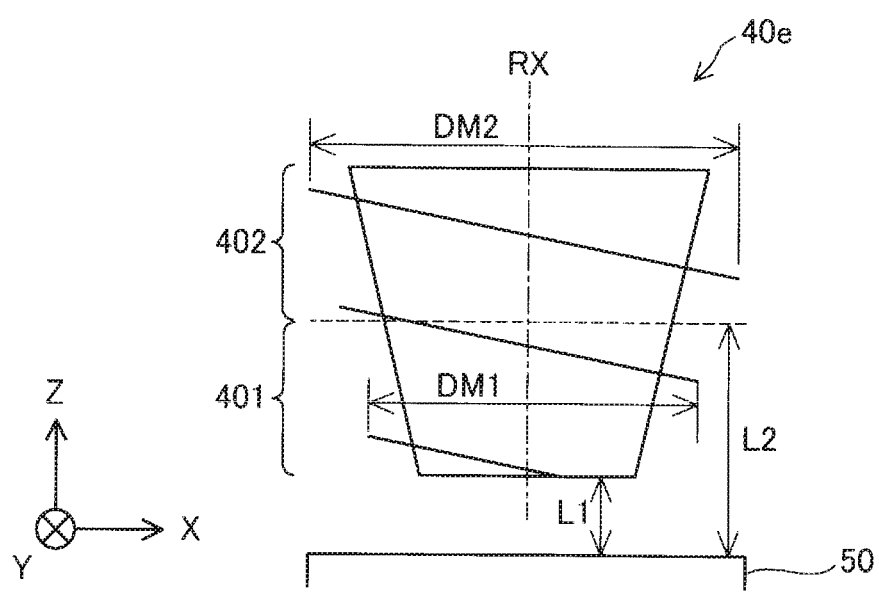
FIG. 10 is a side view showing a schematic configuration of a rotor according to a fifth embodiment.

FIG. 10 is a side view showing a schematic configuration of a rotor 40e according to a fifth embodiment. In the fifth embodiment and the first embodiment, the configuration of the rotor 40e is different, and the other configurations are the same. In the present embodiment, the rotor 40e includes a first rotor portion 401 and a second rotor portion 402. A distance L1 from the barrel 50 to the first rotor portion 401 along the rotation axis RX of the rotor 40 is shorter than a distance L2 from the barrel 50 to the second rotor portion 402 along the rotation axis RX. A diameter DM1 of the first rotor portion 401 is smaller than a diameter DM2 of the second rotor portion 402. More specifically, the rotor 40e is configured such that the diameter of the rotor 40e becomes smaller toward the barrel 50. According to such a configuration, since the side surface of the rotor 40e and the groove forming surface 48 are inclined to intersect with each other, the material can be smoothly supplied from the second groove portion 42 to the first groove portion 41.

As described above, in the fifth embodiment, the diameter DM1 of the first rotor portion 401 is smaller than the diameter DM2 of the second rotor portion 402, but conversely, the diameter DM1 of the first rotor portion 401 can be larger than the diameter DM2 of the second rotor portion 402.

F. Sixth Embodiment

Figure 11:
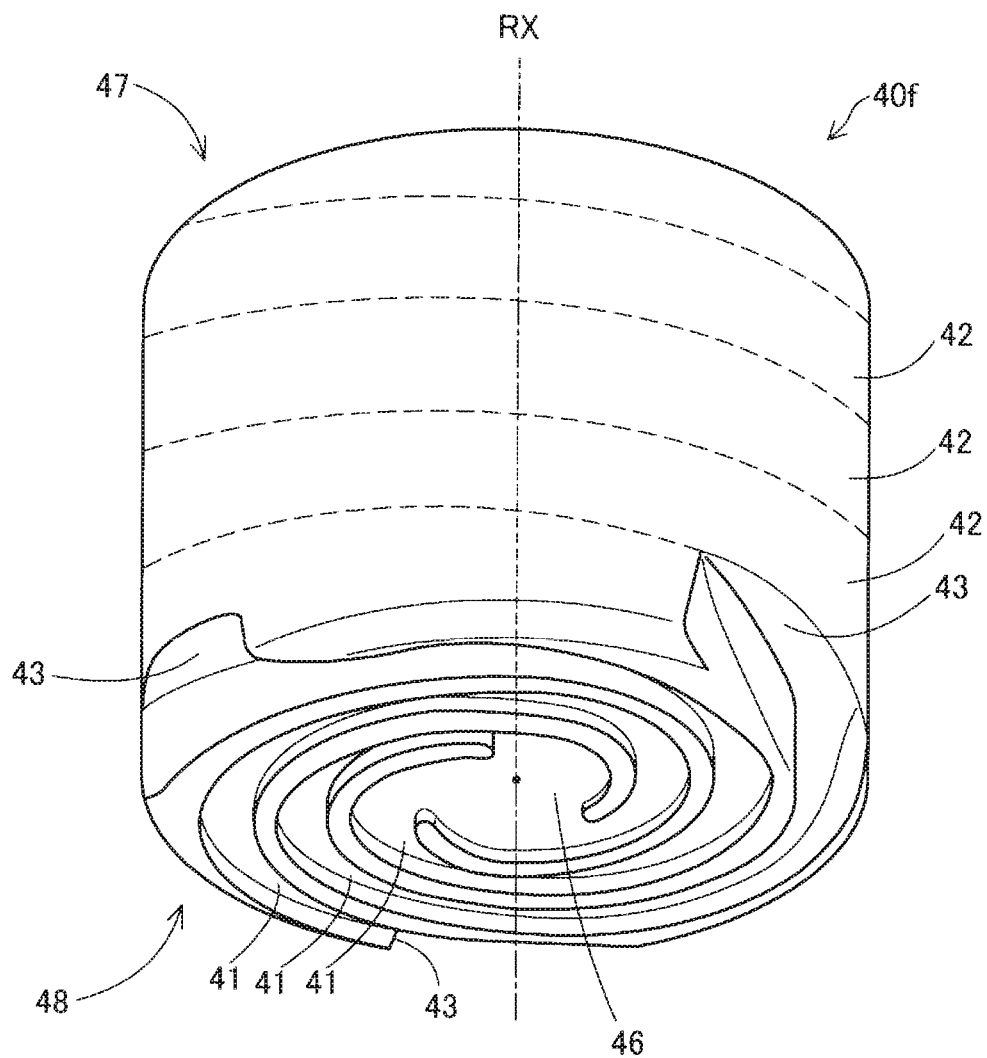
FIG. 11 is a perspective view showing a schematic configuration of a rotor according to a sixth embodiment.

FIG. 11 is a perspective view showing a schematic configuration of a rotor 40f according to a sixth embodiment. In the sixth embodiment and the first embodiment, the configuration of the rotor 40f is different, and the other configurations are the same. In the first embodiment described above, the number of each of the first groove portions 41, the material guiding ports 43, and the second groove portions 42 is one. In contrast, in the sixth embodiment, the rotor 40f includes three first groove portions 41, three material guiding ports 43, and three second groove portions 42. FIG. 11 schematically shows the configuration of the second groove portions 42. Thus, if a plurality of sets of the first groove portion 41, the material guiding port 43, and the second groove portion 42 are provided in the rotor 40f, many materials can be stably supplied between the groove forming surface 48 and the barrel 50. The number of sets of the first groove portion 41, the material guiding port 43, and the second groove portion 42 is not limited to one or three, but may be two or four or more.

The forms of the rotors 40b to 40f from the above-described second embodiment to the sixth embodiment can be combined in any desired way. The number of forms to be combined is not limited to two, and any number of forms can be combined, and all forms may be combined.

G. Seventh Embodiment

Figure 12:
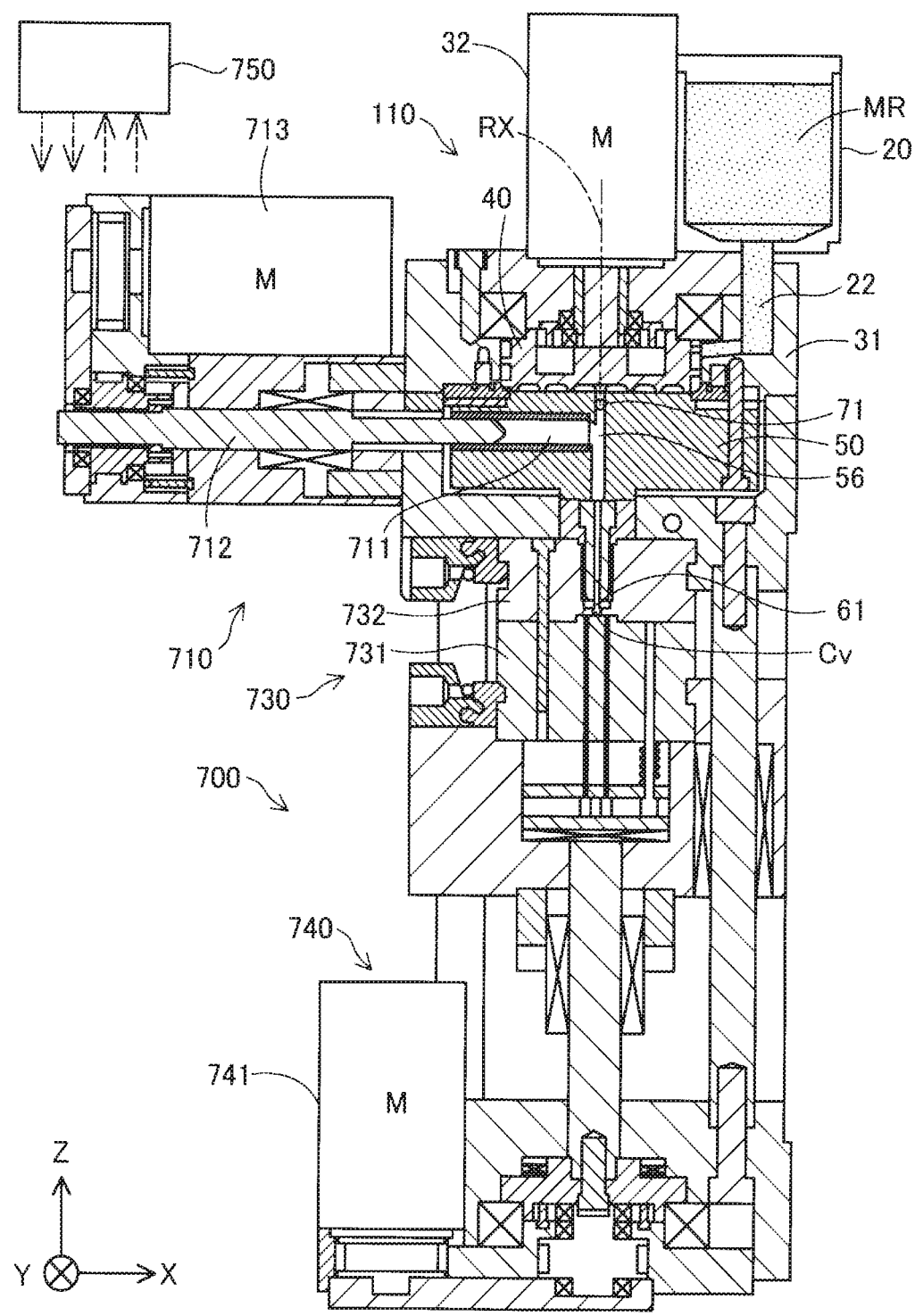
FIG. 12 is a diagram showing a schematic configuration of an injection molding device according to a seventh embodiment.

FIG. 12 is a diagram showing a schematic configuration of an injection molding device 700 according to a seventh embodiment of the present disclosure. The injection molding device 700 includes a plasticization device 110, an injection control mechanism 710, a mold 730, and a mold clamping device 740. The configuration of the plasticization device 110 is the same as that of the first embodiment unless otherwise specified. In the present embodiment, the same components as those in the first embodiment are denoted by the same reference numerals as in the first embodiment.

The plasticization device 110 includes the rotor 40, the barrel 50, and the nozzle 61. A heating unit (not shown) is embedded in the barrel 50. An injection cylinder 711 to be described later is coupled to the through hole 56 of the barrel 50 of the present embodiment. A check valve 71 for preventing backflow of the shaping material from the injection cylinder 711 to the through hole 56 is provided between the through hole 56 and the injection cylinder 711. Under the control of a control unit 750, the plasticization device 110 plasticizes at least a part of the material supplied between the rotor 40 and the barrel 50, and generates the molten material in the form of paste having fluidity to guide the molten material from the through hole 56 to the injection control mechanism 710.

The injection control mechanism 710 includes the injection cylinder 711, a plunger 712, and a plunger drive unit 713. The injection control mechanism 710 has a function of injecting the molten material in the injection cylinder 711 into a cavity Cv to be described later. The injection control mechanism 710 controls an injection amount of the molten material from the nozzle 61 under the control of the control unit 750. The injection cylinder 711 is a substantially cylindrical member coupled to the through hole 56 of the barrel 50, and includes the plunger 712 therein. The plunger 712 slides inside the injection cylinder 711 and pressure-feeds the molten material in the injection cylinder 711 to the nozzle 61 included in the plasticization device 110. The plunger 712 is driven by the plunger drive unit 713 implemented by a motor.

The mold 730 includes a movable mold 731 and a fixed mold 732. The movable mold 731 and the fixed mold 732 face each other, and the cavity Cv that is a space corresponding to a shape of a molded object is provided between the movable mold 731 and the fixed mold 732. The molten material is fed under pressure to the cavity Cv by the injection control mechanism 710, and then is injected via the nozzle 61.

The mold clamping device 740 includes a mold drive unit 741, and has a function of opening and closing the movable mold 731 and the fixed mold 732. Under the control of the control unit 750, the mold clamping device 740 drives the mold drive unit 741 to move the movable mold 731 to open and close the mold 730.

Since the injection molding device 700 of the present embodiment described above includes the rotor 40 similar to that of the first embodiment, it is possible to stably supply the material between the rotor 40 and the barrel 50. Therefore, it is possible to inject the material in a stable molten state with respect to the mold 730. Any form from the first embodiment to the sixth embodiment can be applied to the form of the rotor 40 in the seventh embodiment.

H. Other Aspects

The present disclosure is not limited to the embodiments described above, and may be implemented by various configurations without departing from the scope of the present disclosure. For example, in order to solve some or all of problems described above, or to achieve some or all of effects described above, technical characteristics in the embodiments corresponding to technical characteristics in aspects described below can be replaced or combined as appropriate. If the technical characteristics are not described as essential in the present description, they can be deleted as appropriate.

(1) According to a first aspect of the present disclosure, a plasticization device is provided. The plasticization device includes: a rotor rotating centered on a rotation axis by a drive motor and having a groove forming surface in which a first groove portion is formed along a rotation direction; a rotor case configured to accommodate the rotor; a barrel facing the groove forming surface and having a through hole; and a heating unit, in which a material supplied between the first groove portion and the barrel is plasticized by rotation of the rotor and heating by the heating unit to flow out from the through hole, and a side surface of the rotor has a material guiding port configured to guide the material to the first groove portion, and a second groove portion configured to feed the material supplied between the rotor and the rotor case to the material guiding port.

According to such an aspect, since the material is supplied to the first groove portion formed in the groove forming surface of the rotor through the second groove portion and the material guiding port provided on the side surface of the rotor, the material can be stably supplied between the rotor and the barrel.

(2) In the plasticization device according to the above aspect, the second groove portion may include a first portion continuous with the material guiding port and a second portion farther from the material guiding port than the first portion, and a groove depth of the first portion may be deeper than a groove depth of the second portion. According to such an aspect, the material can be stably supplied between the rotor and the barrel.

(3) In the plasticization device according to the above aspect, the second groove portion may include a first portion continuous with the material guiding port and a second portion farther from the material guiding port than the first portion, and a groove width of the first portion may be larger than a groove width of the second portion. According to such an aspect, the material can be stably supplied between the rotor and the barrel.

(4) In the plasticization device according to the above aspect, the second groove portion may include a first portion continuous with the material guiding port and a second portion farther from the material guiding port than the first portion, the second groove portion may be inclined with respect to a plane orthogonal to the rotation axis, and an inclination angle of the first portion with respect to the plane may be smaller than an inclination angle of the second portion with respect to the plane. According to such an aspect, the material can be smoothly supplied between the rotor and the barrel.

(5) In the plasticization device according to the above aspect, the rotor may include a first rotor portion and a second rotor portion, a distance from the barrel to the first rotor portion along the rotation axis may be shorter than a distance from the barrel to the second rotor portion along the rotation axis, and a diameter of the first rotor portion may be smaller than a diameter of the second rotor portion. According to such an aspect, the material can be smoothly supplied between the rotor and the barrel.

(6) In the plasticization device of the above aspect, the second groove portion may be spiral. According to such an aspect, the material can be stably supplied between the rotor and the barrel.

(7) In the plasticization device of the above aspect, a plurality of sets of the first groove portion, the material guiding port, and the second groove portion may be provided. According to such an aspect, many materials can be stably supplied between the rotor and the barrel.

The present disclosure is not limited to the above-described plasticization device, but may be implemented as various forms such as a three-dimensional shaping device and an injection molding device.

What is claimed is:

1. A plasticization device comprising:
a cylindrical rotor rotating centered on a rotation axis by a drive motor, the cylindrical rotor having an upper surface connected to the drive motor, a bottom surface, and a side surface that connects the upper surface to the bottom surface, the bottom surface having a groove forming surface in which a first groove portion is formed along a rotation direction;
a rotor case configured to accommodate the rotor;
a barrel having a flat surface that faces the first groove portion of the bottom surface of the rotor, a through hole being formed in the barrel that communicates with the first groove portion; and
a heating unit, wherein
a material supplied between the first groove portion and the flat surface of the barrel is plasticized by rotation of the rotor and heating by the heating unit to flow out from the through hole, and
the side surface of the rotor has
a material guiding port configured to guide the material to the first groove portion, and
a second groove portion formed by a flight portion that spirally protrudes outward from the side surface, and the second groove portion is configured to feed the material supplied between the rotor and the rotor case to the material guiding port.

2. The plasticization device according to claim 1, wherein
the second groove portion includes a first portion continuous with the material guiding port and a second portion farther from the material guiding port than the first portion, and
a groove depth of the first portion is deeper than a groove depth of the second portion.

3. The plasticization device according to claim 1, wherein
the second groove portion includes a first portion continuous with the material guiding port and a second portion farther from the material guiding port than the first portion, and
a groove width of the first portion is larger than a groove width of the second portion.

4. The plasticization device according to claim 1, wherein
the second groove portion includes a first portion continuous with the material guiding port and a second portion farther from the material guiding port than the first portion,
the second groove portion is inclined with respect to a plane orthogonal to the rotation axis, and
an inclination angle of the first portion with respect to the plane is smaller than an inclination angle of the second portion with respect to the plane.

5. The plasticization device according to claim 1, wherein
the rotor includes a first rotor portion and a second rotor portion,
a distance from the barrel to the first rotor portion along the rotation axis is shorter than a distance from the barrel to the second rotor portion along the rotation axis, and a diameter of the first rotor portion is smaller than a diameter of the second rotor portion.

6. The plasticization device according to claim 1, wherein the second groove portion is spiral.

7. The plasticization device according to claim 1, wherein a plurality of sets of the first groove portion, the material guiding port, and the second groove portion are provided.

8. A three-dimensional shaping device comprising:

the plasticization device according to claim 1; and a nozzle communicating with the through hole and configured to discharge a plasticized material toward a table.

9. An injection molding device comprising:

the plasticization device according to claim 1; and a nozzle communicating with the through hole and configured to inject a plasticized material to a mold.

* * * * *